United States Patent [19]

Metz

[11] 3,945,744
[45] Mar. 23, 1976

[54] TELESCOPING STRUT CONSTRUCTION

[75] Inventor: Joseph R. Metz, Ridgefield, Conn.

[73] Assignee: Norco, Inc., Ridgefield, Conn.

[22] Filed: Sept. 23, 1974

[21] Appl. No.: 508,689

[52] U.S. Cl. ................. 403/317; 403/349; 403/328
[51] Int. Cl.² ........................................... F16D 1/00
[58] Field of Search ............ 285/313, 316, 86, 277, 285/361, 396; 403/317, 315, 316, 325, 349, 328, 341

[56] References Cited
UNITED STATES PATENTS

| | | | |
|---|---|---|---|
| 1,324,654 | 12/1919 | Ferguson | 285/277 |
| 2,425,992 | 8/1947 | Cadwallader | 285/316 X |
| 3,220,757 | 11/1965 | Potter | 403/340 |
| 3,442,541 | 5/1969 | Metz | 403/316 |
| 3,469,871 | 9/1969 | Betts | 403/325 |

*Primary Examiner*—Andrew V. Kundrat
*Attorney, Agent, or Firm*—H. Gibner Lehmann; K. Gibner Lehmann

[57] ABSTRACT

An extendable and collapsible telescoping strut construction comprising inner and outer tubular members adapted to be slidably received in one another. The inner member is provided with rolled-in portions constituting annular locking grooves, respectively. The outer member has radially extending slots to receive locking dogs which are advanceable toward the inner member so as to engage various annular grooves thereof one at a time and thus hold the inner member in predetermined, fixed positions with respect to the outer member. The latter further carries a spring-biased, slidable collar member which retains the locking dogs in positions of engagement with any one of the annular grooves. Positive, cooperable locking means on the collar member and on the outer tubular member are provided for retaining these two parts in a predetermined, fixed position against accidental bumping or jarring, whereby the locking dogs are firmly held in their advanced, locked positions. The arrangement is such that the spring automatically advances the collar member to its locked position with respect to the outer tubular member as soon as the collar member is released.

7 Claims, 15 Drawing Figures

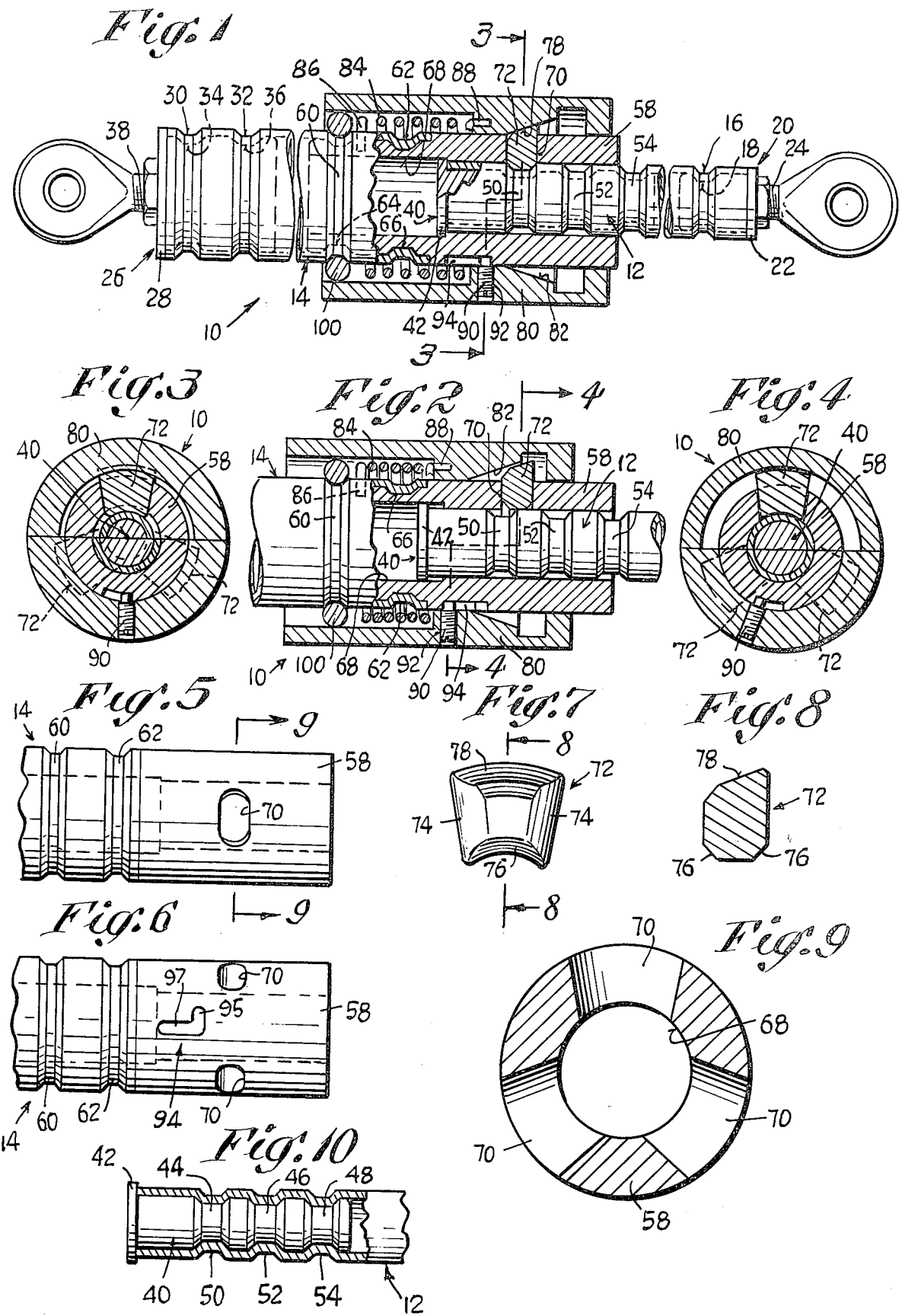

TELESCOPING STRUT CONSTRUCTION

BACKGROUND

This invention relates to struts having releasable fastener means, and more particularly to strut devices of the type having telescoping inner and outer tubular members arranged to be releasably secured to one another in predetermined, fixed positions.

Prior devices of this type have included inner and outer telescoping members wherein the outer member carried arcuate locking dogs in radially extending slots, together with an external sleeve slidable thereon and having an internal camming shoulder engageable with the dogs so as to effect advancing and retracting movement of the latter into grooves or recesses in the inner tubular member. Such a telescoping strut is described in U.S. Pat. No. 3,442,541, issued May 6, 1969 to Joseph R. Metz. The present invention involves improvements to the construction illustrated in FIGS. 6–12 of this patent.

While the devices disclosed in the above mentioned patent operated in a satisfactory manner, there was no provision for positively locking the external sleeve in its advanced position (illustrated in FIG. 6 of the patent) with respect to the outer tubular member. Instead, complete reliance was placed on the ability of the spring to maintain the sleeve in the advanced (locking) position. It has been found that under conditions of substantial tensile or compressive forces applied to the members, there is a possibility of inadvertent release of the strut in the event that the sleeve is accidentally bumped, jarred, or otherwise handled. Due to the large forces which were often involved, such inadvertent releasing of the strut could have undesirable consequences, such as injury to personnel, damage to equipment, etc. It has been found that a more substantial locking arrangement was necessary in order to provide more reliable and foolproof functioning.

SUMMARY

Such drawbacks of prior telescoping strut constructions are obviated by the present invention, which has for an object the provision of an improved, retractable and extensible locking strut which is simple in construction and yet provides greatly increased reliability against failure over that afforded by prior constructions heretofore known. A related object is the provision of a strut construction which may very quickly be operated to either lock it in its extended position or else unlock and collapse it. A further object of the invention is the provision of a strut construction of the type having a locking sleeve, which upon its release, automatically assumes a fully locking condition with a positive-type locking action, from which it cannot be released without the application of combined axial and twisting forces. It has been found that by such arrangement, the likelihood of inadvertent or accidental release of the strut is greatly minimized to such a degree as to be virtually negligible.

The above objects are accomplished by the provision of a pair of inner and outer telescoping strut members adapted to be slidably received one within the other, and releasable means on the members for locking them in predetermined, fixed positions with respect to one another, together with a collar member slidably carried on the outer strut member for actuating the locking means, and a spring biasing the collar member to an advanced position. There is further provided a novel, cooperable means on the outer strut member and collar member for positively securing the latter against longitudinal movement with respect to the outer strut member in response to relative turning movement of the two parts. The locking means comprises locking dogs which are slidably received in radially extending slots of the outer strut member, and annular shoulders on the inner telescoping member adapted to receive the dogs. The latter are urged inwardly by a camming shoulder disposed on the inner surface of the collar member. The securing means on the collar member comprises a radially disposed pin extending into the bore thereof, and means defining a bayonet slot in the outer tubular member. The spring means applies an axial force and a circumferentially acting torque to the collar member with respect to the outer tubular member, such that the pin normally occupies one end of the bayonet slot. Under these circumstances, movement of the collar member in an axial direction is prevented unless it is first rotated through a portion of a revolution to thereby shift the pin to another part of the bayonet slot. The arrangement is such that accidental bumping or jarring of the collar member is unlikely to lead to an inadvertent release of the strut when the latter is supporting a load.

Other features and advantages will hereinafter appear.

In the drawings illustrating several embodiments of the invention:

FIG. 1 is an axial sectional view of a releasable strut construction as provided by the invention, the strut being shown in a fully extended, locked position.

FIG. 2 is a view like FIG. 1, except showing the strut in an unlocked condition, as during adjustment of the length thereof.

FIG. 3 is a section taken on line 3—3 of FIG. 1.

FIG. 4 is a section taken on line 4—4 of FIG. 2.

FIG. 5 is a side elevational view of an end piece portion of the outer strut member of FIGS. 1–4.

FIG. 6 is an elevational view of the opposite side of the end portion of the outer strut member of FIGS. 1–4.

FIG. 7 is a side elevation of a locking dog employed in the strut construction of FIGS. 1–4.

FIG. 8 is a section taken on line 8—8 of FIG. 7.

FIG. 9 is a section taken on line 9—9 of FIG. 5.

FIG. 10 is a fragmentary new, partly in section and partly in side elevation of one end of the inner strut member of FIGS. 1–4.

Figure 11:
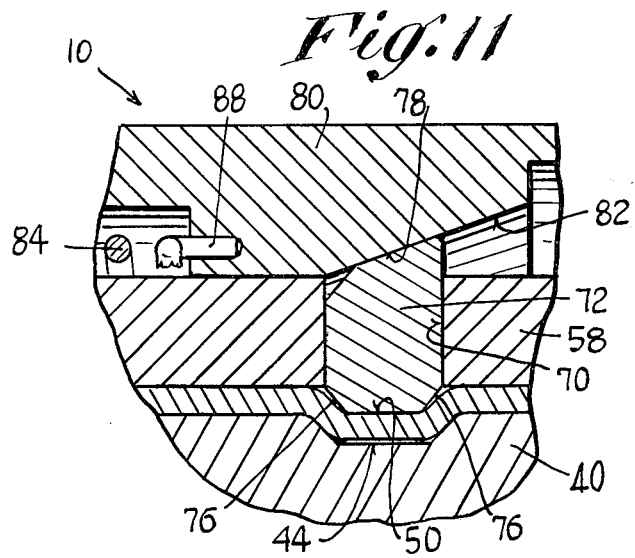
FIG. 11 is an enlarged fragmentary axial section of a portion of the strut construction of FIGS. 1–4.

FIGS. 1–4 illustrate an extensible and retractable strut construction generally designated by the numeral 10, comprising an inner tubular member 12 and an outer tubular member 14 adapted to be slidably and telescopically received in one another. FIG. 1 shows the strut in a fully extended, locked position, and FIG.

2 shows the strut in a released condition, as during adjustment of the overall length thereof. The inner member 12 has an annular rolled-in portion 16 which is received in a corresponding annular groove 18 of an end fitting 20 having a flange 22. Carried on the end fitting 20 is a fastener stud 24 having an eye suitable for attachment to the structure being supported (not shown). The stud is received in a threaded hole of the end fitting 20 and secured therein by means of a locking nut as shown.

The outer tubular member also carries an end fitting 26 having a flange 28. The fitting is retained by annular rolled-in portions 30, 32 in the member which are received in corresponding annular grooves 34, 36 of the fitting 26. A fastener stud 38 is carried by a threaded hole in the fitting 26 and can be locked in place by means of a locking nut as shown.

Referring to FIG. 10, the inner tubular member carries an end plug 40 having a flange 42 abutting the member end. This plug may be of either solid or hollow construction and is adapted to provide reinforcement to the member when the latter is engaged by a locking dog to be described below. In the embodiment shown, the plug has three spaced-apart annular grooves 44, 46 and 48 respectively, which receive annular rolled-in portions 50, 52 and 54 of the inner tubular member 12. It will be understood that the rolled-in portions are imparted to the tubular member 12 following insertion of the plug 40 therein by suitable rolling equipment (not shown).

As shown particularly in FIG. 5, a tubular end fitting 58 is received in the end of the outer member 14. The latter has annular rolled-in portions 60, 62 which are formed around corresponding annular grooves 64, 66 respectively in the end fitting. The latter has a hollow bore 68 and a plurality of radially extending recesses 70 (FIG. 9) communicating with the bore and adapted to receive arcuate locking dogs 72 as showin shown in 1–4 and 11.

The dogs are particularly illustrated in FIGS. 7 and 8, and each has arcuate surfaces 74 which engage corresponding wall surfaces of the recesses 70, bevelled edges 76 which are engageable with the sloped surfaces or shoulders on opposite sides of the annular grooves 50–54, and a cam surface 78 which is engaged by a cooperable cam surface on a sleeve to be described below.

Referring again to FIG. 1, the outer tubular member 14 slidably carries a locking collar 80 which is movable in an axial direction with respect to the member between an advanced, locking position and a retracted, unlocking position. The advanced position is illustrated in FIGS. 1 and 11, and the retracted position is illustrated in FIG. 2. The collar has an annular cam surface 82 on its inner wall, adapted to engage the locking dogs 72 and to impart radially inward movement thereto as the collar is moved toward the right in FIGS. 1 and 11. Disposed in the space between the outer tubular member and the sleeve is a helical compression spring 84 having both its ends anchored, one end being secured by a press fit into the outer tubular member 14 at 86, the other end being similarly secured to the locking sleeve 80 at 88. The spring normally biases the sleeve to its locking position illustrated in FIG. 1, wherein the locking dogs 72 are maintained in firm engagement with the grooves or rolled-in portions 50, 52 or 54 of the inner tubular member 12.

In accordance with the present invention there are provided cooperable means on the outer member and on the sleeve or collar member 80 for locking the latter against longitudinal movement in response to turning thereof with respect to the outer member, the means comprising a locking pin 90 radially extending into the bore of the sleeve, and a recess 94 or slotted formation in the outer surface of the end piece 58 of the outer tubular member 14. The pin 90 can have the form of a screw received in a threaded hole 92 in the sleeve. The recess 94 is in the form of a slot having an L-configuration, this being clearly illustrated in FIG. 6.

By the present invention the spring 84 is so arranged to apply a biasing force to the sleeve in an axial direction, as well as in a circumferential direction. This latter force or torque acts in such a manner as to rotate the sleeve 80 through a portion of a revolution, thus bringing the pin 90 in position to occupy the tail portion 95 of the L-slot 94 when the sleeve is manually released and the inner tubular member 12 advanced to a position wherein one of the grooves 50, 52 or 54 is aligned with respect to the locking dogs 72. From this position, the sleeve cannot be directly moved axially without first undergoing a limited turning movement to align the pin 90 with the body 97 of the L-slot (Fig. 6). The sleeve can then be shifted axially to its retracted, unlocking position with respect to the outer member 14. The cam shoulder 82 of the sleeve thus releases the locking dogs 72, enabling them to be cammed radially outward by the engagement of the surfaces 76 and the grooves 50, 52 or 54 when the inner member 12 is adjusted, collapsed, etc.

With the strut occupying the position of FIG. 2, it will be understood that the pin 90 will be occupying the body portion 97 of the L-slot or recess 94. The spring will be acting in a direction tending to shift the sleeve to the right in FIG. 1 and also counterclockwise in FIG. 4. However, such movement is prevented by the dogs 72, which are not aligned with one of the grooves 50, 52 or 54. The inner member can be manually slid until the location of the next groove coincides with the location of the dogs, at which time the dogs will be advanced into engagement with one of the grooves by the action of the cam surfaces 78, 82, and the sleeve will move to the right in FIG. 2 until the tail portion 95 of the L-slot aligns with the pin 90. The torque of the spring will then rotate the sleeve until the tail 95 of the slot is fully occupied by the pin 90. The strut is thus locked in the position of FIG. 1 and cannot be directly released without first imparting a relative turning movement to the sleeve (clockwise in FIG. 3) and then axial movement thereto (toward the left in FIG. 1). Thus there is minimized the possibility of an inadvertent or accidental release of the strut due to jarring or bumping of the sleeve. A split ring 100 carried on the groove 60 of the outer tubular member provides a slide bearing for the end of the sleeve 80 opposite the location of the locking dogs.

Figure 12:
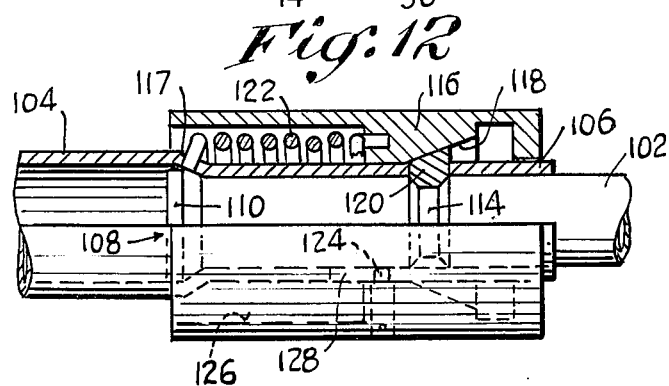
FIG. 12 is a top view, partly in section and partly in elevation, of a modified strut construction constituting another embodiment of the invention.
Figure 13:
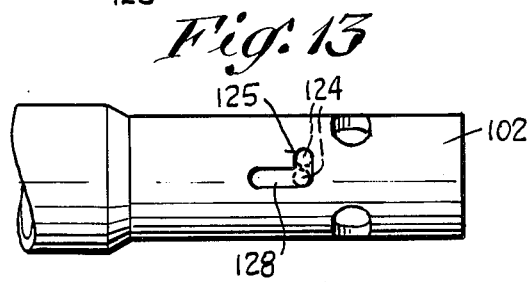
FIG. 13 is a bottom plan view of the outer strut member of FIG. 12, and further illustrating the location of a locking pin carried by the collar member of FIG. 12.

Another embodiment of the invention is illustrated in FIGS. 12 and 13, illustrating an extensible strut construction comprising an inner strut member 102 and an outer strut member 104, the latter having an end portion 106 of reduced diameter and constituting a close, sliding fit with the member 102. The latter is shown as being tubular, although a solid rod could also be employed. An end fitting or plug 108 similar to that of the first embodiment is received in the end of the member 102 and has a cylindrical flange 110 of substantially the same diameter as that of the inner wall of the enlarged portion of the member 104. The plug has an annular groove by which it is retained in the member 102, the latter having an annular rolled-in portion 114 formed into the groove when the two parts are assembled. A collar member 116 is slidably carried on the outer member and has a camming surface or shoulder 118 engaging a locking dog 120 as in the previous embodiment. Depending on the strength required, two, three or more locking dogs can be employed. A compression spring 122 is disposed between the collar member 116 and outer member 104, and has one end fastened to the latter at the location of its annular shoulder 117, the other end of the spring being attached to the collar 116. By the present invention, there are provided cooperable means on the outer strut member 104 and collar member 116 for securing the latter against longitudinal movement with respect to the outer strut member in response to relative turning movement between the two members, the means comprising a pin 124 in the form of a screw carried in the wall of the collar and extending radially into the bore 126 thereof, and means providing a bayonet slot 128 in the outer tubular member 104. As in the previous embodiment, the pin 124 is movable between end limits defined by its engagement with the ends of the slot 128. When the pin 124 is disposed in the position illustrated by one set of dotted lines (upper circle) in FIG. 13, the collar member is disposed in a locked condition with respect to the outer member 104, since the collar member cannot be directly shifted to the left in FIG. 12 unless it is first rotated against the action of spring 122 through a fractional part of a turn, such that the pin occupies the position illustrated by the second set of dotted lines (lower circle) in FIG. 13. From this latter position (the corner of the L-slot), the collar member can be manually displaced toward the left in FIG. 12, against the action of the spring 122 to thereby release the locking dogs 120 and enable adjustment of the length of the strut to be effected. In order to prevent the inner tubular member from being inadvertently separated from the outer member, the flange 110 is made sufficiently large to constitute a stop when it engages the annular shoulder 117. This stop can be located to coincide with alignment of the locking dog 120 and the end-most groove 114 for certain applications, if desired, such that as the strut is extended, the dog will snap into the groove at roughly the same time that engagement of the shoulder 117 by the flange 110 occurs.

Figure 14:
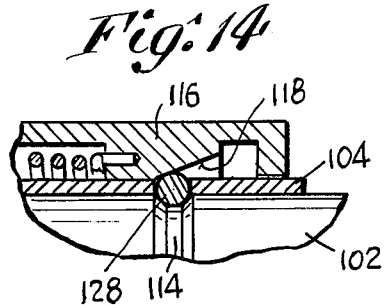
FIG. 14 is a fragmentary axial sectional view of a still further modified strut construction constituting another embodiment of the invention.
Figure 15:
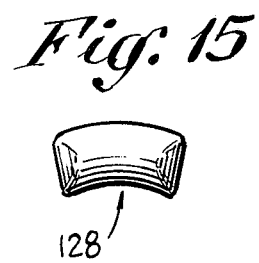
FIG. 15 is a side elevation of the locking dog employed in the construction of FIG. 14.

Another embodiment of the invention is illustrated in FIGS. 14 and 15 wherein like reference numerals indicate similar parts. Inner and outer tubular members 102, 104, respectively are illustrated, the inner member having an annular rolled-in portion 114; a collar member 116 is slidably received on the outer member 104. A modified locking dog 128 is provided, having an arcuate configuration and a substantially circular cross section. The dogs is engaged by the cam surface 118 of the collar member as the latter is shifted toward the right in FIG. 14. The advantage of this construction lies in the fact that the dog 128 can be conveniently and inexpensively cut from wire stock, whereas in the previous embodiments, the dogs required machining, which represented a significant added expense. It is intended that multiple dogs could be employed in the embodiment of FIG. 14; however, only one is shown in the interest of simplicity and clarity.

From the above it can be seen that I have provided a novel and improved telescoping locking strut construction, which is both simple and effective in operation and provides greatly improved strength and reliability over that obtainable with devices heretofore known. The provision of a positive securing means on a collar member insures that the latter is not accidentally released as a result of inadvertent bumping or jarring, this being especially important in cases where the strut is heavily loaded. The device thus represents a distinct advance and improvement in the technology of releasable fastener devices.

Variations and modifications are possible without departing from the spirit of the invention.

I claim:

1. A strut construction comprising, in combination:
   a. A pair of inner and outer strut members adapted to telescope one into the other to effect a composite strut of variable length,
   b. multi-part, cooperable releasable means on said inner and outer members for locking the same in a predetermined, fixed position with respect to one another,
   c. a collar member carried by the outer strut member for actuating said locking means, said collar member being movable longitudinally between an advanced, strut-locking position and a retracted, unlocking position,
   d. means biasing said collar member to its advanced strut-locking position, and
   e. cooperable means on said outer strut member and collar member for securing the latter, when in its advanced position, against longitudinal movement with respect to the outer strut member in response to turning of the collar member on said outer strut member,
   f. said collar member biasing means automatically effecting turning of the collar member to its securing position when the collar member reaches said advanced position, and
   g. the outer strut member having an end portion of reduced diameter, closely and slidably fitting the inner strut member, and having an annular shoulder defining said portion of reduced diameter,
   h. said collar member biasing means comprising a coil spring surrounding and carried by said reduced diameter portion of the outer strut,
   i. one end of said coil spring being secured in said annular shoulder,
   j. the inner end of the inner strut member having an annular stop shoulder engageable with the annular shoulder of the outer strut member to orient the parts of said releasable locking means.

2. A strut construction as in claim 1, wherein:
   a. one end of said spring is secured to the outer strut member,
   b. the other end of the spring being secured to the collar member.

3. A strut construction as in claim 1, wherein:
   a. said spring applies a continuous torque between the collar member and the outer strut member in a circumferential direction.

4. A strut construction as in claim 1, wherein:
   a. said outer strut member is elongate and has a radially extending recess,
   b. said cooperable, releasable locking means comprises a locking dog carried in said recess, c. said inner strut member having a shoulder adapted to be engaged by said locking dog when the latter moves radially inward in said recess.

5. A strut construction as in claim 4, wherein:
a. said locking dog is arcuate and has a substantially circular cross-sectional configuration.

6. A strut construction as in claim 4, wherein:
a. the inner strut member is tubular and has an annular rolled-in portion constituting said shoulder, b. an end fitting disposed inside the strut member and having an annular groove adapted to underlie the rolled-in portion when the latter is formed,
c. said fitting reinforcing the inner member to minimize undesirable flexing of the rolled-in portion when the latter is engaged by the locking dog.

7. A strut construction as in claim 1, wherein:
a. said collar member has a radially extending threaded hole, and
b. a screw received in said hole and extending into said bore.

* * * * *